United States Patent
Yamazaki

(10) Patent No.: US 9,521,603 B2
(45) Date of Patent: Dec. 13, 2016

(54) COMMUNICATION CONTROL METHOD, BASE STATION, AND USER TERMINAL

(71) Applicant: KYOCERA CORPORATION, Kyoto (JP)

(72) Inventor: Chiharu Yamazaki, Ota-ku (JP)

(73) Assignee: KYOCERA Corporation, Kyoto (JP)

(*) Notice: Subject to any disclaimer, the term of this patent is extended or adjusted under 35 U.S.C. 154(b) by 17 days.

(21) Appl. No.: 14/355,322

(22) PCT Filed: Nov. 2, 2012

(86) PCT No.: PCT/JP2012/078514
§ 371 (c)(1),
(2) Date: Apr. 30, 2014

(87) PCT Pub. No.: WO2013/065834
PCT Pub. Date: May 10, 2013

(65) Prior Publication Data
US 2014/0248886 A1    Sep. 4, 2014

Related U.S. Application Data

(60) Provisional application No. 61/555,299, filed on Nov. 3, 2011.

(51) Int. Cl.
*H04W 36/00* (2009.01)
*H04W 36/26* (2009.01)
(Continued)

(52) U.S. Cl.
CPC ......... *H04W 36/26* (2013.01); *H04W 36/0094* (2013.01); *H04W 52/244* (2013.01); *H04W 52/325* (2013.01)

(58) Field of Classification Search
CPC ............... H04W 36/26; H04W 52/244; H04W 36/0094; H04W 52/325
See application file for complete search history.

(56) References Cited

U.S. PATENT DOCUMENTS

| | | |
|---|---|---|
| 2008/0130578 A1 | 6/2008 | Wang et al. |
| 2008/0207209 A1 | 8/2008 | Katori et al. |

(Continued)

FOREIGN PATENT DOCUMENTS

| | | |
|---|---|---|
| JP | 2008-236730 A | 10/2008 |
| JP | 2009-232280 A | 10/2009 |

(Continued)

OTHER PUBLICATIONS

The extended European search report issued by the European Patent Office on Jul. 8, 2015, which corresponds to European Patent Application No. 12846471.6-1855 and is related to U.S. Appl. No. 14/355,322.

(Continued)

*Primary Examiner* — Ajit Patel
(74) *Attorney, Agent, or Firm* — Studebaker & Brackett PC

(57) ABSTRACT

A communication control method in a mobile communication system, comprises: a step A of transmitting information from a base station having at least one cell to a neighboring base station, the information notifying that a particular cell of the base station is to be prevented from being selected as a measurement target for mobility control of a user terminal under control of the neighboring base station; and a step B of, when receiving the information from the base station at the step A, performing control by the neighboring base station based on the received information such that the user terminal under control of the neighboring base station avoids selecting the particular cell as the measurement target.

8 Claims, 11 Drawing Sheets

(51) Int. Cl.
*H04W 52/24* (2009.01)
*H04W 52/32* (2009.01)

(56) References Cited

U.S. PATENT DOCUMENTS

| | | | |
|---|---|---|---|
| 2010/0127332 A1 | 5/2010 | Liu et al. | |
| 2010/0255833 A1 | 10/2010 | Ishii | |
| 2010/0278132 A1* | 11/2010 | Palanki | H04B 1/7107 370/329 |
| 2010/0329189 A1* | 12/2010 | Tsuboi | H04W 24/04 370/328 |
| 2011/0077004 A1 | 3/2011 | Aoyagi | |
| 2011/0170496 A1* | 7/2011 | Fong | H04L 5/0053 370/329 |
| 2012/0063321 A1* | 3/2012 | Chandrasekhar | H04L 1/1896 370/241 |
| 2012/0135771 A1 | 5/2012 | Futaki | |
| 2013/0077518 A1 | 3/2013 | Abe et al. | |

FOREIGN PATENT DOCUMENTS

| | | |
|---|---|---|
| WO | 2009/057481 A1 | 5/2009 |
| WO | 2010/127332 A2 | 11/2010 |
| WO | 2011/016560 A1 | 2/2011 |
| WO | 2011/126025 A1 | 10/2011 |

OTHER PUBLICATIONS

Communication pursuant to Rules 70(2) and 70a(2) EPC issued by the European Patent Office on Jul. 24, 2015, which corresponds to European Patent Application No. 12846471.6—1855 and is related to U.S. Appl. No. 14/355,322.

International Search Report; PCT/JP2012/078514; Jan. 29, 2013.

Research in Motion UK Limited, "PSS/SSS Detection in Heterogeneous Networks", 3GPP TSG-RAN WG1 Meeting #66 R1-112369, Aug. 26, 2011.

3GPP TS 36.300 V10.4.0 (Jun. 2011); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10).

Fujitsu, Considerations on Enhanced Uplink Power Control for CoMP Scenario 4, 3GPP TSG-RAN WG1 #66b R1-113470, Oct. 14, 2011.

An Office Action; "Notice of Reasons for Rejection," issued by the Japanese Patent Office on Nov. 4, 2015, which corresponds to Japanese Patent Application No. 2015-124576 and is related to U.S. Appl. No. 14/355,322; with English language Statement of Relevance.

\* cited by examiner

FIG. 3
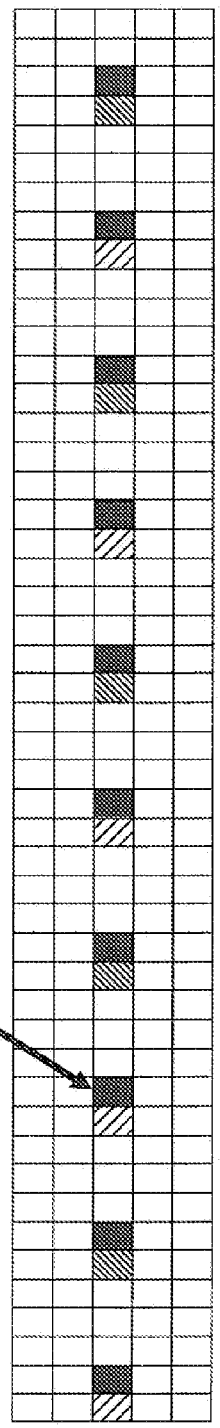
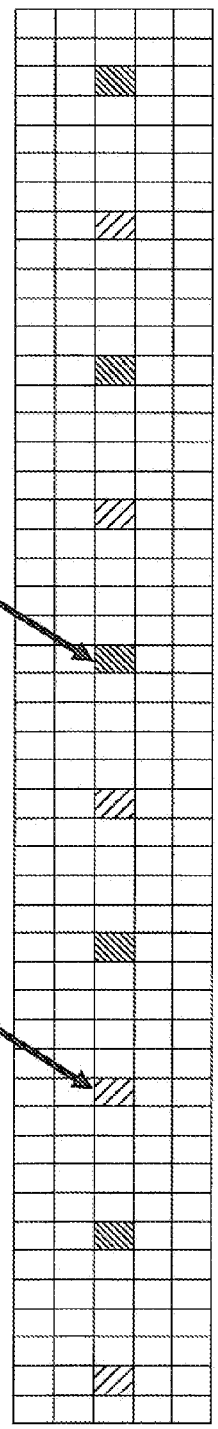

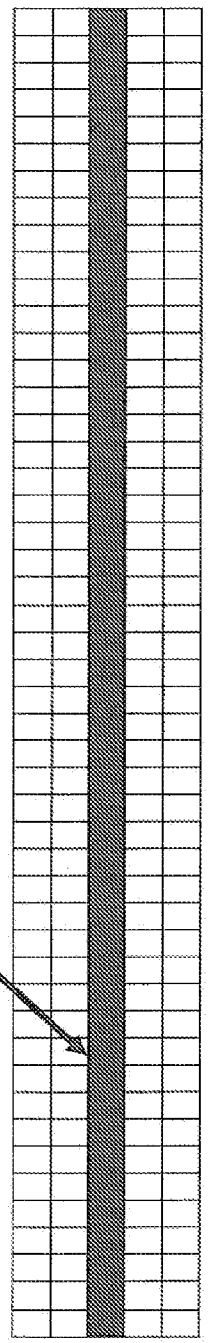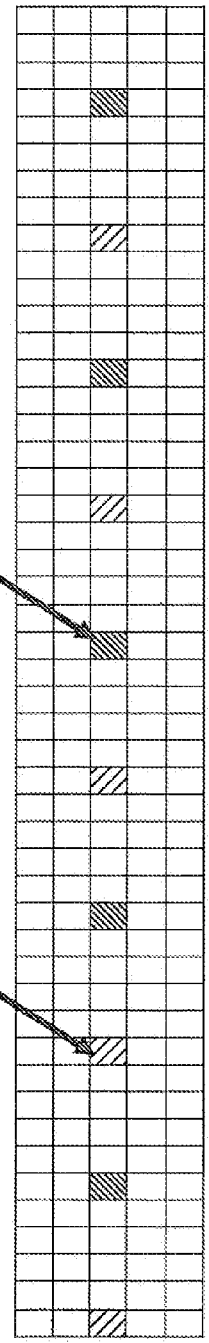
FIG. 5

FIG. 10
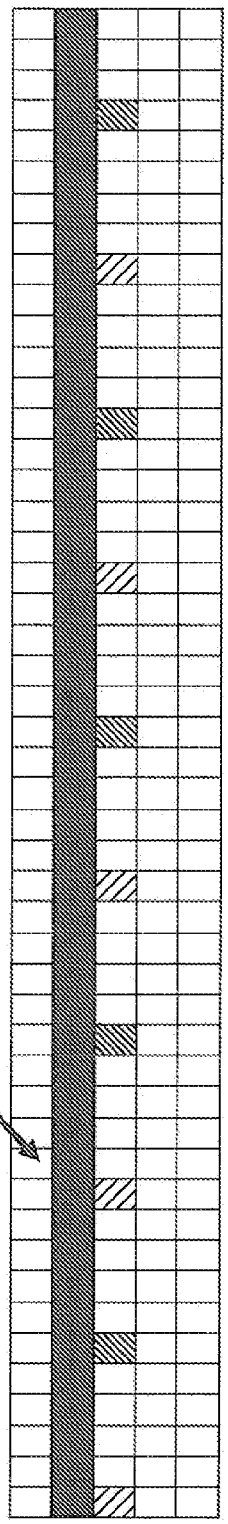
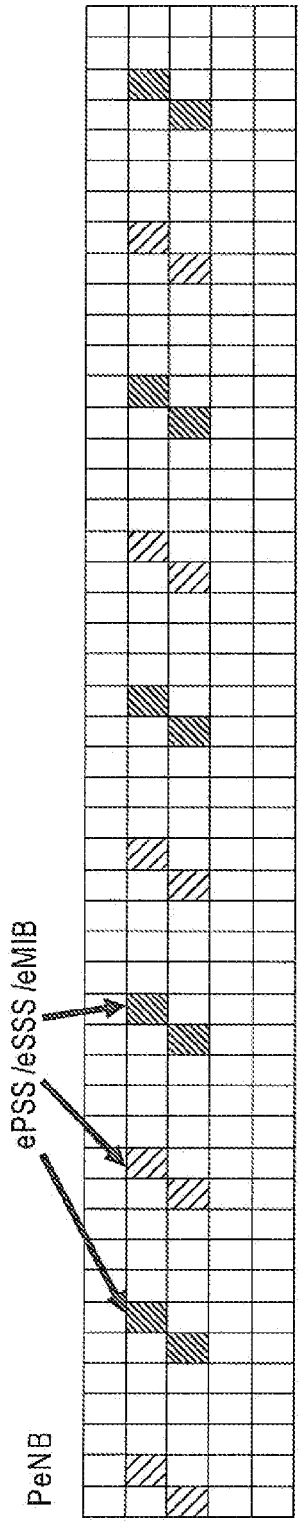

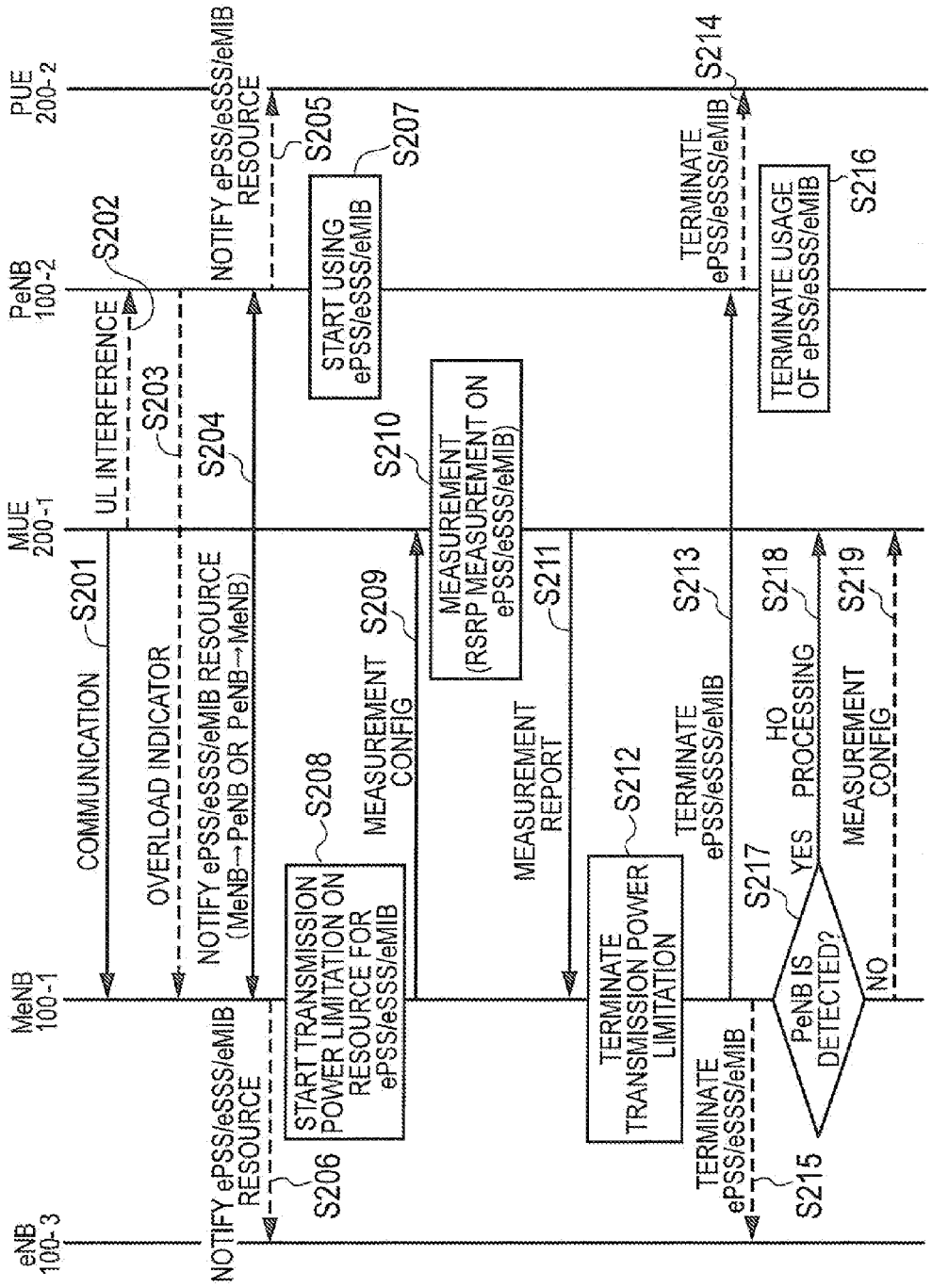

COMMUNICATION CONTROL METHOD, BASE STATION, AND USER TERMINAL

TECHNICAL FIELD

The present invention relates to a communication control method, a base station, and a user terminal in a mobile communication system.

BACKGROUND ART

The 3GPP (3rd Generation Partnership Project), which is a standardization project for mobile communication system, has been developing the standardization of LTE Advanced, which is an advanced version of LTE (Long Term Evolution) after the 3GPP Release 10 (see, for example, 3GPP TS 36.300 v10.4.0).

In LTE-Advanced, study has been made on provision of a heterogeneous network in which a low-power base station (so-called, a pico cell base station or a home base station) is installed in a coverage area of a high-power base station (so-called, a macro base station). The heterogeneous network can distribute a load of the high-power base station to the low-power base station.

In addition, with a view to both providing backward compatibility with LTE and achieving a wider bandwidth, a carrier aggregation technique is introduced to LTE Advanced, in which a carrier in LTE is used as a component carrier (CC) and multiple carriers are used in combination for radio communications. Note that a "carrier" is sometimes treated as a "cell".

CITATION LIST

Non-Patent Documents

Non-Patent Documents 1: 3GPP TS36.300 v10.4.0

SUMMARY OF INVENTION

In a heterogeneous network where a high-power base station and a low-power base station use the same carrier, if a user terminal connected with the high-power base station is located around the boundary of a coverage area of the low-power base station, the low-power base station may receive uplink interference from the user terminal.

In this connection, the following procedure, for example, is under consideration as a solution to the uplink interference. Specifically, based on a measurement report from a user terminal connected with a high-power base station, the high-power base station infers that an interference source is the user terminal succeeding in measurement for a low-power base station (that is, the user terminal that can normally receive a synchronization signal from the low-power base station), and causes the user terminal of the interference source to perform handover to another carrier.

However, even when being located around the boundary of the coverage area of the low-power base station, the user terminal connected with the high-power base station cannot receive a synchronization signal from the low-power base station because the synchronization signal is cancelled out by a downlink signal from the high-power base station due to a transmission power difference between the base stations. In this case the user terminal cannot synchronize with the low-power base station nor perform the measurement for the low-power base station.

A possible solution to this is that the high-power base station limits transmission power (specifically, cuts power or decreases power) at timing and frequency in which the low-power base station transmits the synchronization signal, so that a user terminal can perform the measurement for the low-power base station.

It is specified that the frequency band for transmitting a synchronization signal is 6 resource blocks in the center in a carrier. When a high-power base station and a low-power base station synchronize with each other with setting of such offset (subframe offset) as to transmit synchronization signals at different timings, the high-power base station does not need to limit the transmission power of the synchronization signal. On the other hand, when a high-power base station and a low-power base station do not synchronize with each other, or synchronize with each other without setting of the offset, the high-power base station needs to limit transmission power.

However, if a high-power base station limits transmission power, communication disruption or communication failure may occur in a user terminal that is located under control of a neighboring base station and is to perform handover to the cell (carrier) of the high-power base station or a user terminal under control of the high-power base station.

Accordingly, an objective of the present invention is to solve the above-described problems.

A communication control method according to the present invention is a communication control method in a mobile communication system. The method comprises: a step A of transmitting information from a base station (e.g. MeNB 100-1) having at least one cell to a neighboring base station (e.g. eNB 100-3), the information notifying that a particular cell of the base station is to be prevented from being selected as a measurement target for mobility control of a user terminal (e.g. UE 200-3) under control of the neighboring base station; and a step B of, when receiving the information from the base station at the step A, performing control by the neighboring base station based on the received information such that the user terminal under control of the neighboring base station avoids selecting the particular cell as the measurement target.

A base station according to the present invention is a base station (e.g. MeNB 100-1) having at least one cell in a mobile communication system. The base station comprises a transmission unit configured to transmit information to a neighboring base station (e.g. eNB 100-3), the information notifying that a particular cell of the base station is to be prevented from being selected as a measurement target for mobility control of a user terminal (e.g. UE 200-3) under control of the neighboring base station.

A base station according to the present invention is a base station (e.g. eNB 100-3) in a mobile communication system. The base station comprises: a reception unit configured to receive information from a neighboring base station (e.g. MeNB 100-1), the information notifying that a particular cell of the neighboring base station is to be prevented from being selected as a measurement target for mobility control of a user terminal (e.g. UE 200-3) under control of the base station; and a control unit configured to perform control such that the user terminal under control of the base station avoids selecting the particular cell as the measurement target based on the information received by the reception unit.

A communication control method according to the present invention is a communication control method in a mobile communication system. The method comprises: a step A of transmitting information from a base station (e.g. MeNB 100-1) having at least one cell to a neighboring base station (e.g. eNB 100-3), the information instructing the neighboring base station to select a particular cell of the base station as a measurement target for mobility control of a user terminal (e.g. UE 200-3) under control of the neighboring base station; and a step B of, when receiving the information from the base station at the step A, performing control by the neighboring base station based on the received information such that the user terminal under control of the neighboring base station selects the particular cell as the measurement target.

A base station according to the present invention is a base station (e.g. MeNB 100-1) having at least one cell in a mobile communication system. The base station comprises a transmission unit configured to transmit information to a neighboring base station (e.g. eNB 100-3), the information instructing the neighboring base station to select a particular cell of the base station as a measurement target for mobility control of a user terminal (e.g. UE 200-3) under control of the neighboring base station.

A base station according to the present invention is a base station (e.g. eNB 100-3) in a mobile communication system. The base station comprises a reception unit configured to receive information from a neighboring base station (e.g. MeNB 100-1), the information instructing the neighboring base station to select a particular cell of the neighboring base station as a measurement target for mobility control of a user terminal under control of the base station; and a control unit configured to perform control such that the user terminal under control of the base station selects the particular cell as the measurement target based on the information received by the reception unit.

A communication control method according to the present invention is a communication control method in a mobile communication system. The method comprises: a step A of limiting, by a base station (e.g. MeNB 100-1) having at least one cell, transmission power in one part of a frequency band in a particular cell, wherein the step A includes at least one of: a step A1 of limiting transmission power of a synchronization signal and/or transmission power of a master information block, a step A2 of limiting transmission power of a physical downlink control channel region, and a step A3 of limiting transmission power of a common reference signal.

The communication control method according to the present invention, wherein at the step A, the base station limits transmission power in the one part of the frequency band in some of subframes.

The communication control method according to the present invention, wherein at the step A, the base station limits transmission power in the one part of the frequency band in all subframes.

The communication control method according to the present invention, further comprises a step B of, when the base station limits transmission power of the synchronization signal and/or the master information block at the step A, transmitting information on the transmission power limitation from the base station to a neighboring base station (e.g. eNB 100-3).

The communication control method according to the present invention, further comprises: a step C of, when the base station limits transmission power of the synchronization signal and/or the master information block at the step A, transmitting from the base station to a neighboring base station (e.g. eNB 100-3), the information notifying that the particular cell from being selected as a measurement target for mobility control of a user terminal (e.g. UE 200-3) under control of the neighboring base station; and a step D of, when the neighboring base station receives the information from the base station at the step C, performing control by the neighboring base station based on the received information such that the user terminal under control of the neighboring base station avoids selecting the particular cell as the measurement target.

The communication control method according to the present invention, further comprising a step E of, when the base station limits transmission power of the common reference signal at the step A, notifying, by the base station, a user terminal (e.g. MUE 200-1) under control of the base station of a radio resource targeted for the transmission power limitation.

The communication control method according to the present invention, further comprising a step F of, after the user terminal under control of the base station is notified of the radio resource targeted for the transmission power limitation at the step E, excluding, by the user terminal, a measurement result for the radio resource from measurement results to be reported to the base station.

A base station according to the present invention is a base station (e.g. MUE 200-1) having at least one cell in a mobile communication system. The base station comprises: a limitation unit configured to limit transmission power in one part of a frequency band in a particular cell, wherein the limitation unit limits transmission power of at least one of a synchronization signal, a master information block, a physical downlink control channel region, and a common reference signal.

A communication control method according to the present invention is a communication control method in a mobile communication system which includes a first base station (e.g. MeNB 100-1) having a first cell and a second base station (e.g. PeNB 100-2) having a second cell. The method comprising: a step A of transmitting information from the first base station to a user terminal under control of the first base station, the information instructing the user terminal to measure a reference signal received power of the second cell based on a common reference signal only within a particular resource block; and a step B of, when the user terminal receives the information from the first base station at the step A, measuring, by the user terminal, the reference signal received power of the second cell based on the common reference signal only within the particular resource block in the second cell according to the received information.

A base station according to the present invention is a base station (e.g. MeNB 100-1) in a mobile communication system. The base station comprises a transmission unit configured to transmit information to a user terminal (e.g. MUE 200-1) under control of the base station, the information instructing the user terminal to measure reference signal received power of another base station based on a common reference signal only within a particular resource block.

A user terminal according to the present invention is a user terminal (e.g. MUE 200-1) in a mobile communication system, comprising: a reception unit configured to receive information from a first base station (e.g. MeNB 100-1), the information instructing the user terminal to measure reference signal received power of a cell of a second base station (e.g. PeNB 100-2) based on a common reference signal only within a particular resource block; and a measurement unit configured to measure the reference signal reception power of the cell of the second base station based on the common reference signal only within the particular resource block according to the information received by the reception unit.

A communication control method according to the present invention is a communication control method in a mobile communication system which includes a first base station (e.g. MeNB 100-1) having a first cell and a second base station (e.g. PeNB 100-2) having a second cell. The method comprises: a step A of notifying, by the first base station, a user terminal (e.g. MUE 200-1) under control of the first base station of downlink bandwidth information of the second cell; and a step B of, when the user terminal receives the information from the first base station at the step A, measuring, by the user terminal, reference signal received power of the second cell based on the received information without acquiring downlink bandwidth information from the second cell.

A base station according to the present invention is a base station (e.g. MeNB 100-1) in a mobile communication system. The base station comprises a notification unit configured to notify a user terminal (e.g. MUE 200-1) under control of the base station of downlink bandwidth information of a cell of another base station (e.g. PeNB 100-2).

A user terminal according to the present invention is a user terminal (e.g. MUE 200-1) in a mobile communication system. The user terminal comprises: a reception unit configured to receive downlink bandwidth information of a cell of a second base station (e.g. PeNB 100-2) from a first base station (e.g. MeNB 100-1); and a measurement unit configured to measure reference signal received power of a cell of the second base station based on the information received by the reception unit without acquiring downlink bandwidth information from the cell of the second base station.

BRIEF DESCRIPTION OF THE DRAWINGS

FIG. 3 shows one example of muting/power reduction in a case where an MeNB and a PeNB according to the first embodiment operate in subframe synchronization with setting of subframe offset.

FIG. 5 shows one example of muting/power reduction in a case where the MeNB and PeNB according to the first embodiment operate out of subframe synchronization.

FIG. 10 shows one example of ePSS/eSSS/eMIB and muting/power reduction in a case where the MeNB and PeNB according to the second embodiment operate out of subframe synchronization.

FIG. 11 shows one example of an entire operation of the mobile communication system according to the second embodiment.

DESCRIPTION OF EMBODIMENTS

Figure 1:
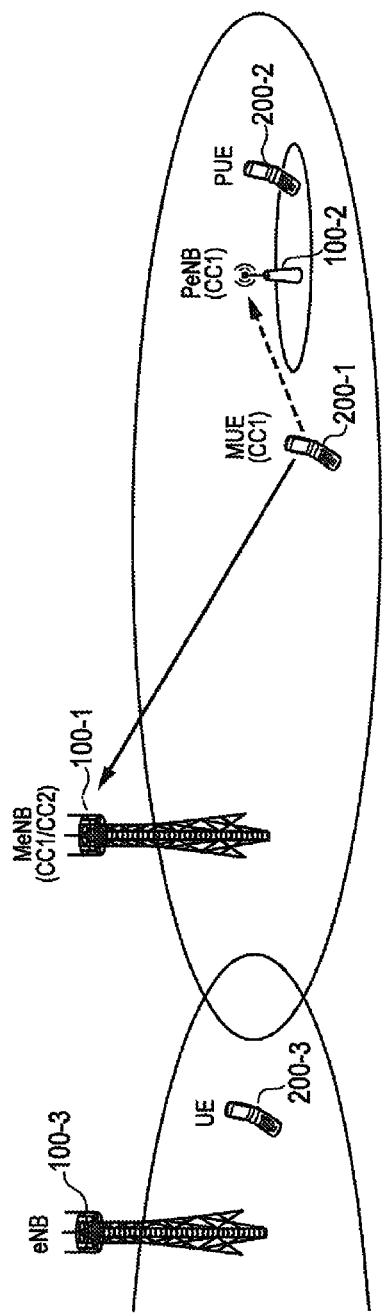
FIG. 1 shows a mobile communication system according to first and second embodiments.

Embodiments of the present invention are described below by referring to the drawings. In the drawings of the embodiments, same or similar reference numerals are given to same or similar portions.

[First Embodiment]

FIG. 1 shows a mobile communication system according to the present embodiment. A mobile communication system according to the present embodiment is configured based on LTE Advanced (after the 3GPP Release 10).

As shown in FIG. 1, the mobile communication system has a macro base station (Macro evolved Node-B: MeNB) 100-1 forming a large-scale coverage area, a pico cell base station (Pico evolved Node-B: PeNB) 100-2 forming a small-sized coverage area, and an eNB 100-3 in the neighborhood of the MeNB 100-1. As an eNB 100-3, an MeNB is illustrated but it may be a PeNB. Also, FIG. 1 shows only one PeNB 100-2 installed within the coverage area of the MeNB 100-1, but multiple PeNBs 100-2 may be installed within the coverage area of the MeNB 100-1. Each of the MeNB 100-1, PeNB 100-2, and eNB 100-3 is connected with one or multiple user terminals (User Equipment: UE).

Hereinafter, a UE connected with the MeNB 100-1 is referred to as an MUE 200-1, a UE connected with the PeNB 100-2 is referred to as a PUE 200-2, and a UE connected with the eNB 100-3 is referred to as a UE 200-3. In addition, when the MeNB 100-1, PeNB 100-2, and eNB 100-3 are not particularly distinguished from one another, they are simply called as an eNB 100, and when the MUE 200-1, PUE 200-2, and UE 200-3 are not particularly distinguished from one another, they are simply referred to as a UE 200.

Note that connection means a state where the UE 200 synchronizes with the eNB 100, that is, a state where a radio resource can be allocated from the eNB 100 to the UE 200. Also, uplink means a communication direction from the UE 200 to the eNB 100, and downlink means a communication direction from the eNB 100 to the UE 200.

The MeNB 100-1, PeNB 100-2, and eNB 100-3 are included in E-UTRAN (Evolved-UMTS Terrestrial Radio Access Network), which is a LTE radio access network. In the present embodiment, E-UTRAN is configured as a heterogeneous network, and the PeNB 100-2 is installed in the coverage area of the MeNB 100-1 and also in a high-traffic zone (so-called, a hot zone), for example.

In the present embodiment, the MeNB 100-1 supports two different carriers (CC1, CC2) and can use a carrier selected from the two carriers for radio communications. Each carrier includes multiple resource blocks (RB) in a frequency direction. In addition, in the embodiment, the PeNB 100-2 supports one carrier (CC1) and uses the one carrier for radio communications.

The coverage area includes one or more cells. The cell is identified by a cell ID and is associated with a carrier. Note that a carrier, an eNB 100 using the carrier, and a coverage area of the eNB 100 are collectively referred to as a cell. For this reason, the MeNB 100-1 is sometimes referred to as a macro cell and the PeNB 100-2 is referred to as a pico cell. Each cell (each CC) broadcasts a synchronization signal to be used for synchronization, a master information block (MIB) containing system information and a system information block (SIB). The synchronization signal contains a primary synchronization signal (PSS) and a secondary synchronization signal (SSS).

The UE 200 can switch a cell of a connection destination (referred to as a serving cell) while being in a connected (RRC Connected) state that is equivalent to a state being connected. Such serving cell switching is implemented by, for example, a handover. The handover of the UE 200 is controlled by the serving cell of the UE 200.

An X2 interface, which is a logical communication channel for connecting neighboring base stations with each other, is set up between the MeNB 100-1 and the PeNB 100-2. Also, an S1 interface, which is a logical communication channel with an EPC (Evolved Packet Core) which is an LTE core network, is set up between the EPC and the MeNB 100-1 and between the EPC and the PeNB 100-2.

As described above, when the MeNB 100-1 and the PeNB 100-2 use the same carrier (CC1) and the MUE 200-1 using CC1 is located around the boundary of the coverage area of the PeNB 100-2, the PeNB 100-2 may receive uplink interference from the MUE 200-1. In this case, based on a measurement report from the MUE 200-1, the MeNB 100-1 infers that an interference source is the MUE 200-1 succeeding in measurement for reference signal received power (RSRP) for the PeNB 100-2, that is, the MUE 200-1 that can normally receive PSS/SSS from the PeNB 100-2, and causes the MUE 200-1 of the interference source to perform handover to another other carrier (CC2). In this way, the MeNB 100-1 can solve the uplink interference.

However, even though the MUE 200-1 is located around the boundary of the coverage area of the PeNB 100-2, the MUE 200-1 cannot synchronize with the PeNB 100-2 nor perform RSRP measurement for the PeNB 100-2 if the PSS/SSS from the PeNB 100-2 is cancelled out by the downlink signal from the MeNB 100-1 due to a transmission power difference between the MeNB 100-1 and the PeNB 100-2. In order that the MUE 200-1 can normally perform the RSRP measurement for the PeNB 100-2, the MUE 200-1 requires not only the PSS/SSS from the PeNB 100-2 but also the MIB from the PeNB 100-2. This is because the RSRP measurement requires downlink bandwidth information and the MIB includes the downlink bandwidth information.

For this reason, the MeNB 100-1 limits the transmission power (specifically, cuts power or decreases power) at timing and a frequency band in which the PeNB 100-2 of CC1 transmits PSS/SSS/MIB, so that the MUE 200-1 can perform the RSRP measurement for the PeNB 100-2. In the following, the power cut is referred to as "muting" and the power decrease is referred to as "power reduction".

Figure 2:
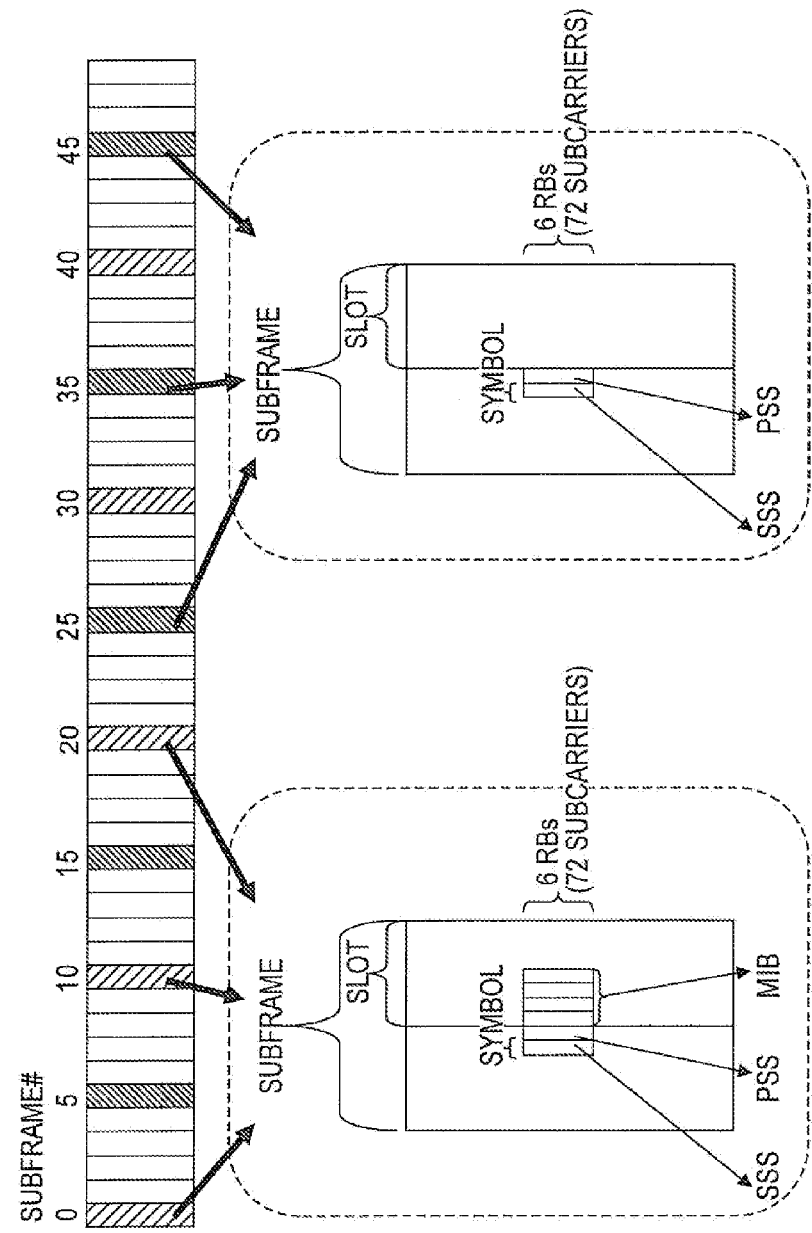
FIG. 2 shows a radio resource configuration which is used in the mobile communication system according to the first and second embodiments.

Here, the timing and frequency band of PSS/SSS/MIB are described. FIG. 2 shows a radio frame configuration which is used in the mobile communication system according to the present embodiment. As shown in FIG. 2, the radio frame includes 10 subframes arranged in a time direction and each subframe includes two slots. Each subframe has a length of 1 ms and each slot has a length of 0.5 ms. Also, each slot includes 7 OFMD symbols in the time direction and multiple RBs in a frequency direction. It is specified that the frequency band for transmitting PSS/SSS/MIB is 6 RBs in the center. The PSS is mapped to the last OFDM symbol of the first-half slot for every 5-th subframe and the SSS is mapped to the second OFDM symbol from the last in the same slot (that is, just before the PSS). The MIB is mapped to the fourth OFDM symbol from the head of the second-half slot for every 10-th subframe (every radio frame). Note that in the downlink, a region of several symbols from the head of each subframe is used as a physical downlink control channel (PDCCH) region and the following region is used as a downlink shared channel (PDSCH) region.

FIG. 3 shows one example of muting/power reduction in a case where the MeNB 100-1 and the PeNB 100-2 operate in subframe synchronization with the setting of subframe offset. As shown in FIG. 3, in cases where the MeNB 100-1 and the PeNB 100-2 operate in subframe synchronization with the setting of such subframe offset as to transmit PSS/SSS/MIB at different timings, the MeNB 100-1 only needs to perform the muting/power reduction on a radio resource (the 6 RBs in the center in specific subframes) for the PSS/SSS/MIB, and does not need to perform the muting/power reduction on the PSS/SSS/MIB of the MeNB 100-1.

Figure 4:
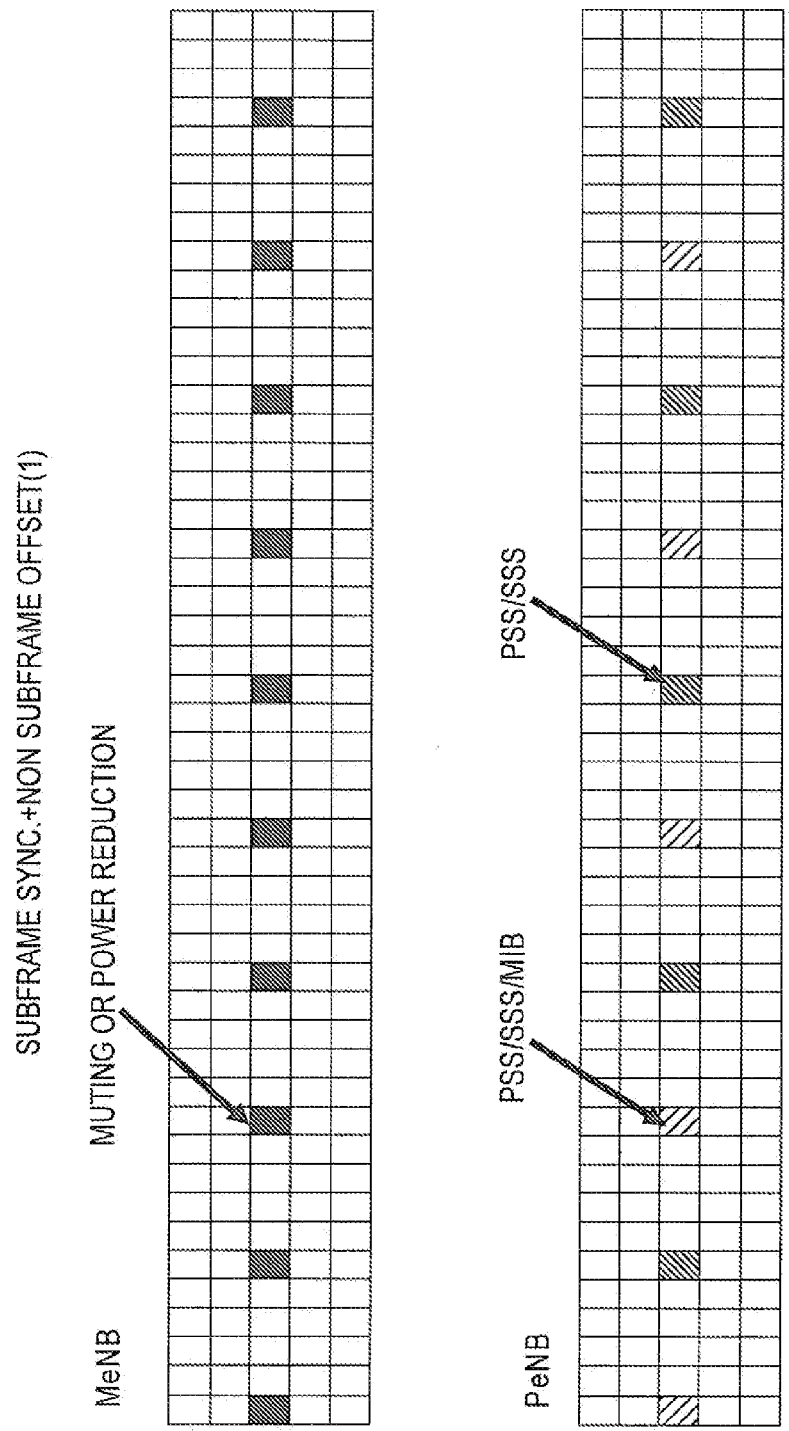
FIG. 4 shows one example of muting/power reduction in a case where the MeNB and PeNB according to the first embodiment operate in subframe synchronization without setting of subframe offset.

FIG. 4 shows one example of muting/power reduction in a case where the MeNB 100-1 and PeNB 100-2 operate in subframe synchronization without the setting of the subframe offset. As shown in FIG. 4, in the case where the MeNB 100-1 and the PeNB 100-2 operate in subframe synchronization without the setting of the subframe offset, the PSS/SSS/MIB of the MeNB 100-1 and the PSS/SSS/MIB of the PeNB 100-2 coincide with each other. Thus, the MeNB 100-1 has to perform the muting/power reduction on the PSS/SSS/MIB.

FIG. 5 shows one example of muting/power reduction in a case where the MeNB 100-1 and the PeNB 100-2 operate out of subframe synchronization. As shown in FIG. 5, in the case where the MeNB 100-1 and the PeNB 100-2 operate out of subframe synchronization, the MeNB 100-1 cannot identify at which timing (subframe) the PeNB 100-2 transmits PSS/SSS/MIB. Thus, the MeNB 100-1 has to perform the muting/power reduction on the 6 RBs in the center in all subframes in which the PeNB 100-2 possibly transmits PSS/SSS/MIB.

Such muting/power reduction can be performed for not only the PSS/SSS/MIB, but also a common reference signal (CRS), a PDCCH region, and an SIB. As shown in FIG. 4 and FIG. 5, when the MeNB 100-1 performs the muting/power reduction in CC1, communication disruption or communication failure may occur in the UE that is to perform handover to the cell of the MeNB 100-1 (the UE 200-3 under control of the eNB 100-3 in the neighborhood of the MeNB 100-1 in FIG. 1) or in the MUE 200-1 under control of the MeNB 100-1.

Specifically, the UE 200-3 under control of the eNB 100-3 cannot find a cell of CC1 any longer by searching, and thus re-connection due to handover failure or the like may occur. Also, when the muting/power reduction is performed on CRS in addition to the PSS/SSS/MIB, the MUE 200-1 determines that the state of a propagation path between the MUE 200-1 and the MeNB 100-1 is deteriorated, and therefore transmits a CSI (Channel State Information) report showing the deteriorated state of the propagation path to the MeNB 100-1. As a result, the MeNB 100-1 cannot perform proper MCS (Modulation and Coding Scheme) control or multi-antenna control on the MUE 200-1. Thus, a throughput of the MUE 200-1 may be decreased.

For this reason, in the present embodiment, the following processing for the muting/power reduction is performed in order to properly perform a cell search for mobility control of the UE 200-3 under control of the eNB 100-3. Here, the mobility control means handover control or cell reselection control. Note that the UE 200-3 may be in an idle (RRC Idle) state or a connection (RRC Connected) state.

Specifically, the MeNB 100-1 transmits information to the eNB 100-3 on the X2 interface, the information notifying that a cell (the cell of CC1) under the muting/power reduction is to be prevented from being selected as a measurement (cell search) target for the mobility control of the UE 200-3. The information contains, for example, information designating the cell of CC1 as a cell search non-target cell. When receiving the information from the MeNB 100-1 on the X2 interface, the eNB 100-3 performs control based on the received information such that the UE 200-3 will avoid selecting the cell (the cell of CC1) under the muting/power reduction a measurement target. For example, in the case of using CC1/CC2, the eBN 100-3 perform such control that a measurement gap using CC2 is configured for the UE using CC1 and a measurement gap using CC1 is not configured for the UE using CC2. Accordingly, the cell search for the mobility control of the UE 200-3 under control of the eNB 100-3 can be properly performed.

Instead, the MeNB 100-1 transmits information to the eNB 100-3 on the X2 interface, the information instructing the eNB 100-3 to select the cell (the cell of CC2) not under the muting/power reduction as a measurement (cell search) target for the mobility control of the UE 200-3. The information contains, for example, information designating the cell of CC2 as a cell search target cell. When receiving the information from the MeNB 100-1 on the X2 interface, the eNB 100-3 performs control based on the received information such that the UE 200-3 will select the cell (the cell of CC2) not under the muting/power reduction as a measurement target. For example, the eNB 100-3 performs such control that a measurement gap using CC2 is configured for an UE not using CC2 among UEs under control of the eNB 100-3. Accordingly, the cell search for the mobility control of the UE 200-3 under control of the eNB 100-3 can be properly performed.

Furthermore, on the X2 interface, the MeNB 100-1 may give the eNB 100-3 at least one of notifications that the muting/power reduction in the cell of CC1 will be performed, that the muting/power reduction is being performed, and that the muting/power reduction is terminated.

In the present embodiment, when the muting/power reduction is performed, the following processing is performed in order for the MUE 200-1 to properly perform the CSI report. Note that, the CSI report contains a CQI (Channel Quality Information) report, PMI (Precoding Matrix Indicator), and RI (Rank Indicator).

Specifically, the MeNB 100-1 notifies the MUE 200-1 of a radio resource (subframe and RB) targeted for the muting/power reduction when performing the muting/power reduction on the CRS. After receiving the notification of the radio resource targeted for the muting/power reduction, the MUE 200-1 excludes the measurement result for the radio resource from the other measurement results to be reported to the MeNB 100-1. For example, in the case of the wide band CQI that is the average of the quality measurement results of all the RBs in the downlink bandwidth calculated and reported as CQI, the MUE 200-1 calculates and reports as CQI the average of the measurement results of only the RBs other than an RB targeted for the muting/power reduction. In addition, in the case of the muting/power reduction performed only on the specific subframe, if the measurement timing coincides with the muting/power reduction timing, the MUE 200-1 may delay the measurement until a subframe not under the muting/power reduction. With this, the MUE 200-1 can properly perform the CSI report.

As described above, the MUE 200-1 performs the RSRP measurement for the PeNB 100-2 within a period during which the MeNB 100-1 performs the muting/power reduction. In general, the RSRP measurement is performed on CRS in the RBs of the entire downlink bandwidth. However, the muting/power reduction is performed only on one part of the radio resource, and the CRS from the PeNB 100-2 is still affected by the interference from the MeNB 100-1. Thus, the MUE 200-1 may fail to properly perform the RSRP measurement for the PeNB 100-2. For this reason, it is preferable, but not essential, that the RSRP measurement be performed only on a specific RB.

Accordingly, in the present embodiment, the MeNB 100-1 transmits information for instructing the MUE 200-1 to measure RSRP of the PeNB 100-2 based only on CRS within a specific RB (RB under the muting/power reduction). The information contains information to designate RBs targeted for the RSRP measurement. When receiving the information from the MeNB 100-1, the MUE 200-1 measures the RSRP for the PeNB 100-2 based on the CRS only within the specific RB according to the information. With this, the MUE 200-1 can properly perform the RSRP measurement for the PeNB 100-2.

As described above, the MUE 200-1 performs the RSRP measurement for the PeNB 100-2 within a period during which the MeNB 100-1 performs the muting/power reduction. In general, the RSRP measurement for the PeNB 100-2 is performed based on the downlink bandwidth information contained in the MIB transmitted by the PeNB 100-2. However, the MUE 200-1 may fail to normally acquire the downlink bandwidth information contained in the MIB transmitted by the PeNB 100-2.

For this reason, in the present embodiment, the MeNB 100-1 notifies the MUE 200-1 of the downlink bandwidth information of the PeNB 100-2 (CC1). The information is, for example, the number of resource blocks. In the MIB, as described in TS 36.331, an index expressing the number of resource blocks in the form of {n6, n15, n25, n50, n75, n100} is notified, and the notification may be made in a similar manner. When receiving the information from the MeNB 100-1, the MUE 200-1 does not acquire the downlink bandwidth information in the MIB by receiving the MIB from the PeNB 100-2, but performs the RSRP measurement for the PeNB 100-2 based on the received information. With this, the MUE 200-1 can properly perform the RSRP measurement for the PeNB 100-2.

Figure 6:
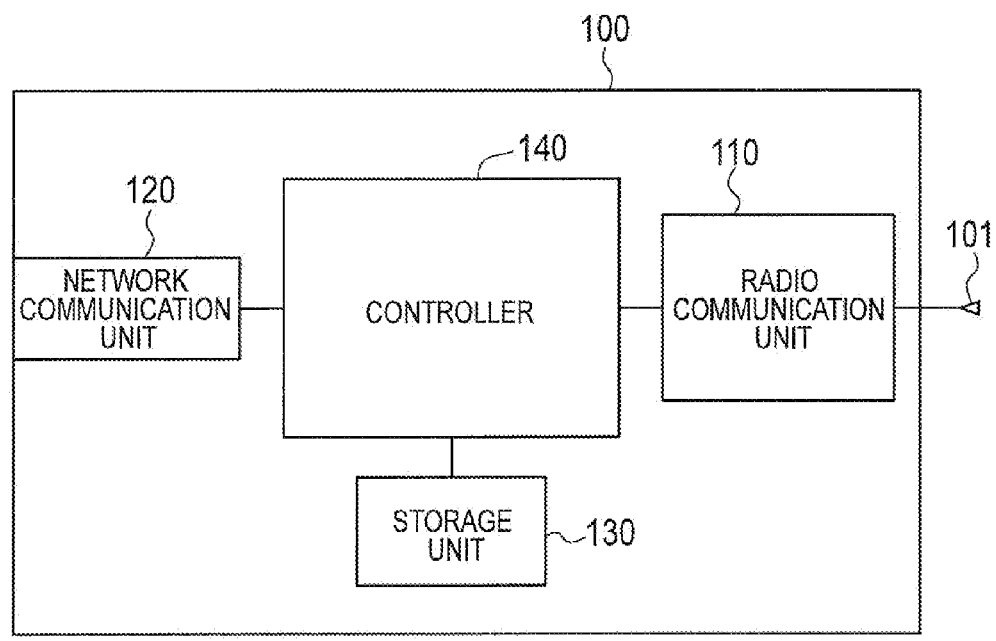
FIG. 6 is a block diagram of an eNB according to the first and second embodiments.

Hereinafter, the configuration of the eNB 100 is described. FIG. 6 is a block diagram of the eNB 100. As shown in FIG. 6, the eNB 100 has an antenna 101, a radio communication unit 110, a network communication unit 120, a storage unit 130, and a controller 140. The antenna 101 is used for transmitting and receiving radio signals, including, for example, multiple antenna elements. The radio communication unit 110 is configured using, for example, a radio frequency (RF) circuit and a base band (BB) circuit and transmits/receives a radio signal via the antenna 101. The network communication unit 120 performs communications between base stations with a neighboring eNB 100 on the X2 interface. Also, the network communication unit 120 performs communications with the EPC on an S1 interface. The storage unit 130 stores various pieces of information to be used for controlling the eNB 100 or the like. The controller 140 controls various kinds of functions included in the eNB 100.

Figure 7:
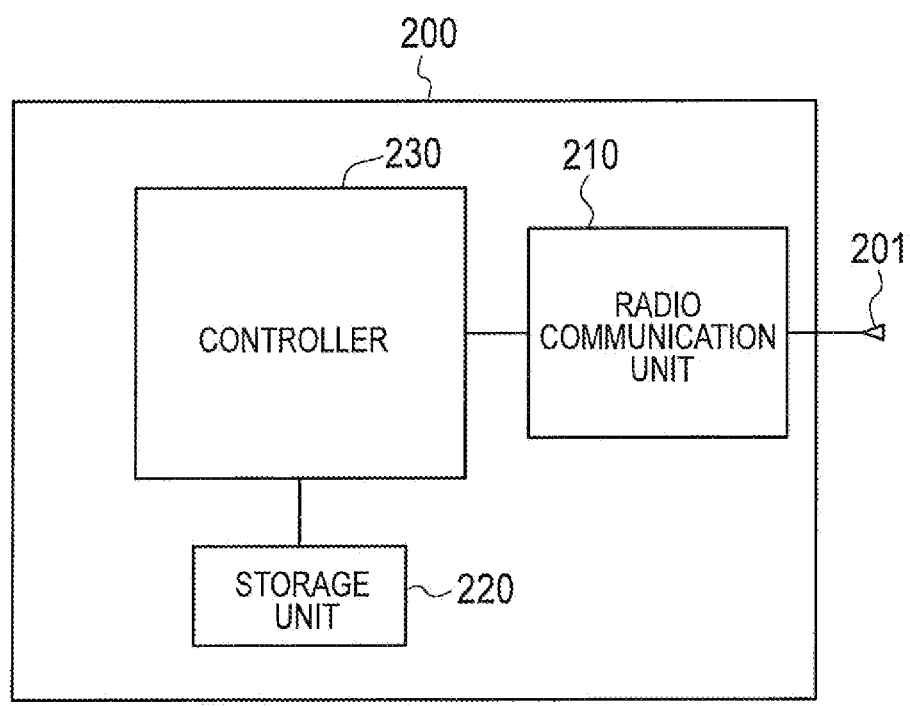
FIG. 7 is a block diagram of a UE according to the first and second embodiments.

Hereinafter, the configuration of a UE 200 is described. FIG. 7 is a block diagram of the UE 200. As shown in FIG. 7, the UE 200 has an antenna 201, a radio communication unit 210, a storage unit 220, and a controller 230. The antenna 201 is used for transmission and reception of a radio signal. The radio communication unit 210 is configured using, for example, a RF circuit and a BB circuit and transmits/receives a radio signal via the antenna 201. The storage unit 220 stores various pieces of information to be used for controlling the UE 200 or the like. The controller 230 controls various kinds of functions included in the UE 200.

Hereinafter, using the situation shown in FIG. 1 as an example, an overall operation of the mobile communication system according to the present embodiment is described.

Figure 8:
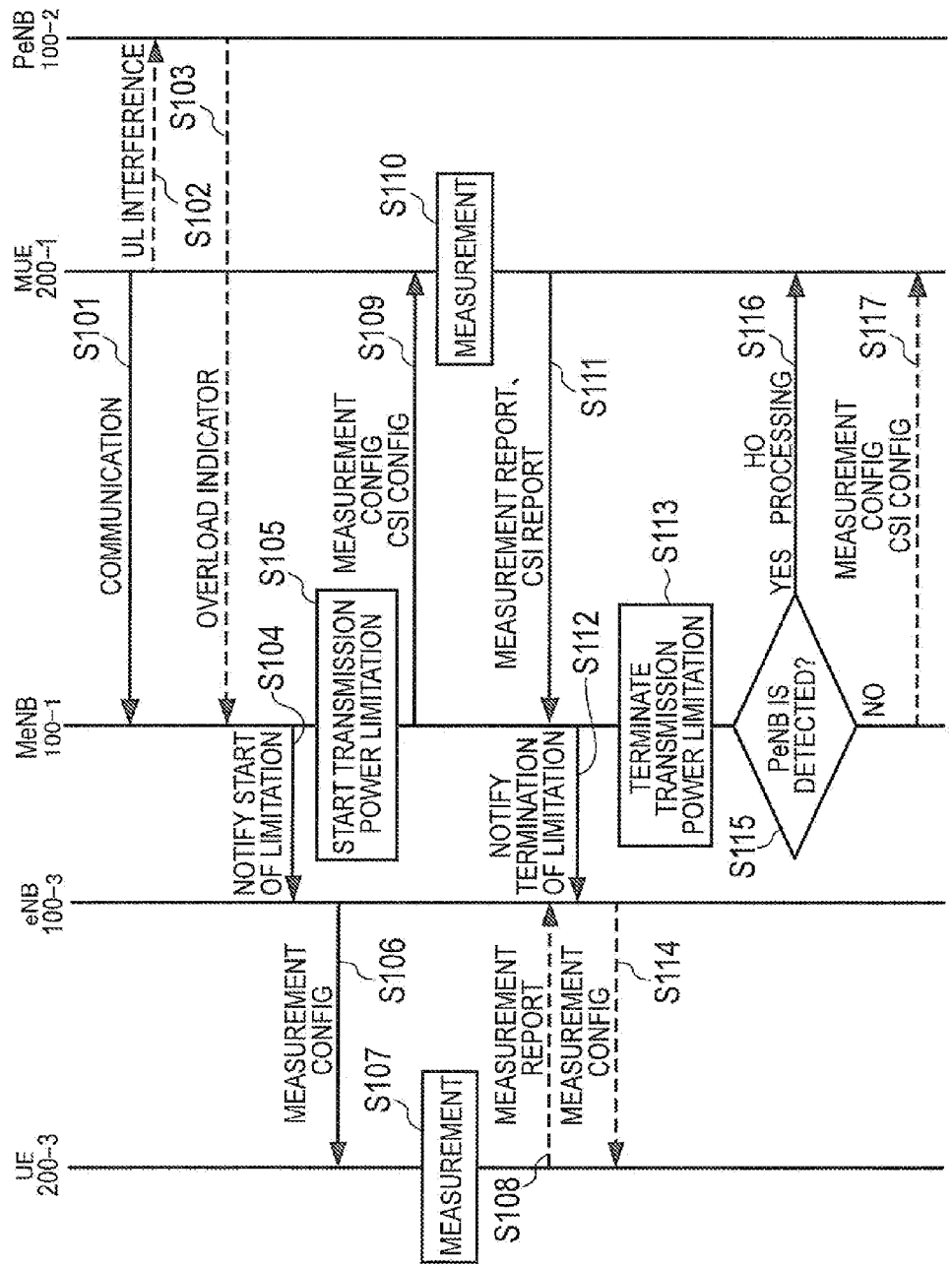
FIG. 8 shows one example of an entire operation of the mobile communication system according to the first embodiment.

FIG. 8 shows one example of an entire operation of the mobile communication system according to the present embodiment. In an initial state of this sequence, the MUE 200-1 does not detect a cell of the PeNB 100-2 nor reports the RSRP measurement result for the PeNB 100-2 to the MeNB 100-1. Note that the signaling shown by the broken line in FIG. 8 is not necessarily needed.

As shown in FIG. 8, at step S101, the MUE 200-1 performs radio communications with the MeNB 100-1. At step S102, the PeNB 100-2 receives interference by an uplink signal from the MUE 200-1. The PeNB 100-2 measures an interference level for each RB in the uplink. At step S103, the PeNB 100-2 transmits Overload Indicator showing the interference level for each RB in the uplink to the MeNB 100-1 on the X2 interface. With this, the uplink interference detected by the PeNB 100-2 is notified to the MeNB 100-1. The MeNB 100-1 grasps that the uplink interference is caused in the PeNB 100-2 based on the Overload Indicator from the PeNB 100-2. Then, processing to search for an MUE 200-1 being an interference source among the MUEs 200-1 is started.

At step S104, the MeNB 100-1 notifies an eNB 100-3 on the X2 interface that the muting/power reduction is performed in the cell of CC1. Or, the MeNB 100-1 may notify/instruct that the cell of CC1 is set to be a cell search non-target cell or may notify/instruct that the cell of CC2 is set to be a cell search target cell.

At step S105, the MeNB 100-1 starts the muting/power reduction.

At step S106, in response to the notification at step S104, the eNB 100-3 performs control such that the UE 200-3 will avoid selecting the cell (the cell of CC1) under the muting/power reduction as a measurement target. Or, the eNB 100-3 performs control such that the UE 200-3 will select the cell (the cell of CC2) not under the muting/power reduction as a measurement target.

At step S107, in response to the control at step S106, the UE 200-3 performs measurement (cell search) for a cell other than the cell (the cell of CC1) under the muting/power reduction. At step S108, the UE 200-3 repots the measurement result at step S107 to the eNB 100-3.

On the other hand, at step S109, the MeNB 100-1 performs the measurement control on the MUE 200-1 when the muting/power reduction is started at step S105. Specifically, the MeNB 100-1 transmits information for instructing the MUE 200-1 to perform the RSRP measurement for the PeNB 100-2 based only on the CRS within a specific RB. In addition, the MeNB 100-1 notifies the MUE 200-1 of the downlink bandwidth information of the PeNB 100-2. Furthermore, the MeNB 100-1 notifies the MUE 200-1 of a radio resource (subframe and RB) targeted for the muting/power reduction when the muting/power reduction is performed on the CRS.

At step S110, the MUE 200-1 performs the RSRP measurement and the CSI measurement in response to the control at step S109. Specifically, the MUE 200-1 measures RSRP for the PeNB based only on the CRS within the specific RB which is notified from the MeNB 100-1 among the RBs contained in the downlink bandwidth notified from the MeNB 100-1. Or, based on the notified downlink bandwidth, the MUE 200-1 may measure RSRP for the entire bandwidth. In addition, when for the muting/power reduction is performed on the CRS, the MUE 200-1 excludes the CSI measurement result for the radio resource targeted for the muting/power reduction from the measurement results to be reported to the MeNB 100-1.

At step S111, the MUE 200-1 reports the measurement result at step S111 to the MeNB 100-1. Here, if the MUE 200-1 is located around the boundary of the coverage area of the PeNB 100-2, the measurement report includes the RSRP measurement result for the PeNB 100-2.

Note that, the processing at steps S109 to S111 may be performed on multiple MUEs 200-1 individually, or may be performed only on a candidate MUE 200-1 located around the boundary of the coverage area of the PeNB 100-2.

On terminating the collection of such measurement reports, at step S112, the MeNB 100-1 notifies the eNB 100-3 on the X2 interface that the muting/power reduction is terminated in the cell of CC1. Or, the MeNB 100-1 may notify/instruct that the cell of CC1 is set to be a cell search target cell.

At step S113, the MeNB 100-1 terminates the muting/power reduction.

At step S114, in response to the notification at step S112, the eNB 100-3 performs control such that the UE 200-3 will also select the cell (the cell of CC1) under the muting/power reduction as a measurement target.

At step S115, the MeNB 100-1 checks whether the measurement report received at step S111 contains the RSRP measurement result for the PeNB 100-2 (for example, the RSRP measurement result corresponding to a cell ID of the PeNB 100-2). When the measurement report does not contain the RSRP measurement result for the PeNB 100-2 (step S117; NO), the measurement setting at step S109 is cancelled at step S117.

On the other hand, when the RSRP measurement result for PeNB 100-2 is contained in the measurement report (step S115: YES), the MUE 200-1 is identified as an uplink interference source for the PeNB 100-2. Then, at step S116, the MeNB 100-1 causes the MUE 200-1 of the interference source to perform handover from the cell of CC1 to the cell of CC2. Or, if possible, the MUE 200-1 of the interference source may perform handover to a cell of the PeNB 100-2.

[Second Embodiment]

In the following, a second embodiment is described in terms of differences from the first embodiment.

In the present embodiment, in a CC1, a PeNB 100-2 transmits new PSS/SSS/MIB (second PSS/SSS/MIB) at another frequency band (a second frequency band) in addition to normal PSS/SSS/MIB (first PSS/SSS/MIB) transmitted in a center frequency band (a first frequency band). Hereinafter, such new PSS/SSS/MIB is referred to as "ePSS/eSSS/eMIB". Basically, the configuration of ePSS/eSSS/eMIB is same as the configuration of normal PSS/SSS/MIB. However, eMIB may contain frequency offset information of ePSS and eSSS. Here, the frequency offset means frequency offset of ePSS and eSSS from the normal PSS/SSS, that is, frequency offset of ePSS and eSSS from a DC sub-carrier. Note that the frequency offset of eMIB can be expressed by immediate data of the number of resource blocks (notation such as +10, −13 as offset from the center or, normal RB number notation such as 0, . . . , N_RB−1) or some predetermined indexes among the data (such as {n6, n15, n25, n36} which differs depending on a bandwidth).

The radio resource (subframe and RB) to be used for transmission of ePSS/eSSS/eMIB may be determined by the PeNB 100-2 or may be determined by the MeNB 100-1. When it is determined by the PeNB 100-2, the radio resource to be used for the transmission of ePSS/eSSS/eMIB is notified from the PeNB 100-2 to the MeNB 100-1. On the other hand, when it is determined by the MeNB 100-1, the radio resource to be used for the transmission of ePSS/eSSS/eMIB is notified from the MeNB 100-1 to the PeNB 100-2.

In addition, the MeNB 100-1 notifies the MUE 200-1 of the radio resource to be used for transmission of ePSS/eSSS/eMIB. Then, the MeNB 100-1 performs muting/power reduction with the radio resource (subframe and RB) for the ePSS/eSSS/eMIB. The MUE 200-1 performs RSRP measurement using the ePSS/eSSS/eMIB received from the PeNB 100-2 within a time period during which the muting/power reduction is performed.

With this, the MeNB 100-1 does not need to perform the muting/power reduction on the normal PSS/SSS/MIB. Thus, a UE 200-3 under control of the eNB 100-3 neighboring the MeNB 100-1 can search for a cell of CC1 in the MeNB 100-1 and does not cause reconnection due to a handover failure.

Figure 9:
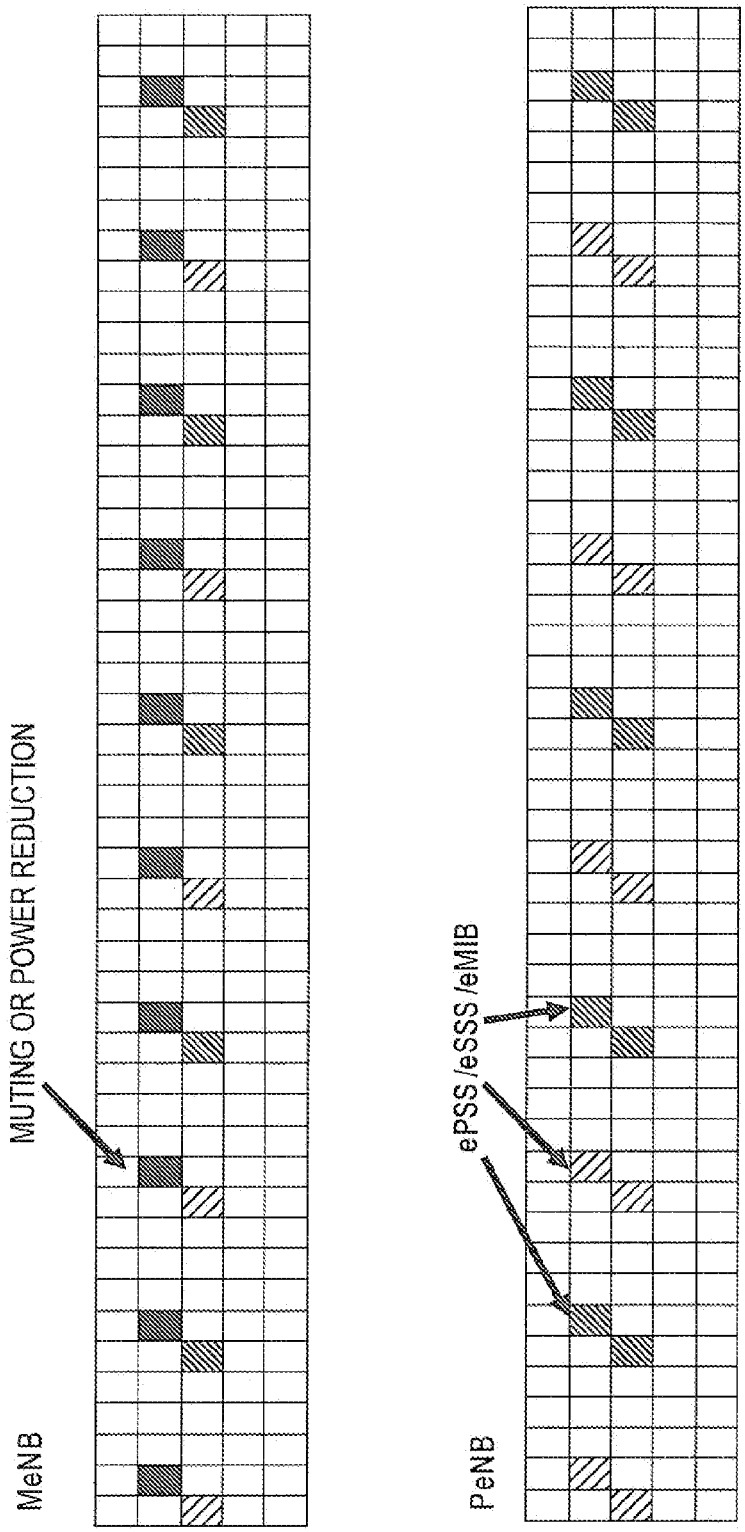
FIG. 9 shows one example of ePSS/eSSS/eMIB and muting/power reduction in a case where the MeNB and PeNB according to the second embodiment operate in subframe synchronization.

FIG. 9 shows one example of ePSS/eSSS/eMIB and muting/power reduction in a case where the MeNB 100-1 and PeNB 100-2 operate in subframe synchronization. As shown in FIG. 9, in the present embodiment, the PeNB 100-2 transmits ePSS, eSSS, and eMIB within a same RB and a same subframe. In this manner, as similar to the normal PSS/SSS/MIB, the ePSS, eSSS, and eMIB are transmitted in the same subframe and same RB (6 RB), so that a measurement processing load can be reduced as compared with the case where the ePSS, eSSS, and eMIB are distributed.

Also, when the MeNB 100-1 and PeNB 100-2 operate in subframe synchronization, the MeNB 100-1 performs the muting/power reduction only on the radio resource (specific subframe and 6 RBs) for the ePSS/eSSS/eMIB of the PeNB 100-2.

FIG. 10 shows one example of ePSS/eSSS/eMIB and muting/power reduction in a case where the MeNB 100-1 and PeNB 100-2 operate out of subframe synchronization. As shown in FIG. 10, as similar to the above, in this case, the PeNB 100-2 also transmits ePSS, eSSS, and eMIB within a same RB and a same subframe. In addition, when the MeNB 100-1 and PeNB 100-2 operate out of subframe synchronization, the MeNB 100-1 performs the muting/power reduction on the 6 RBs in the center and all subframes.

Hereinafter, using the situation shown in FIG. 1 as an example, an entire operation of the mobile communication system according to the present embodiment is described. FIG. 11 shows one example of an entire operation of the mobile communication system according to the present embodiment. In an initial state of the present sequence, the MUE 200-1 does not detects a cell of the PeNB 100-2 and does not report the RSRP measurement result for the PeNB 100-2 to the MeNB 100-1. Note that the signaling shown by the broken line in FIG. 11 is not necessarily needed.

As shown in FIG. 11, at step S201, the MUE 200-1 performs radio communications with the MeNB 100-1. At step S202, the PeNB 100-2 receives interference by an uplink signal from the MUE 200-1. The PeNB 100-2 measures an interference level for each RB in the uplink. At step S203, the PeNB 100-2 transmits Overload Indicator showing the interference level for each RB in the uplink to the MeNB 100-1 on the X2 interface. With this, the uplink interference detected by the PeNB 100-2 is notified to the MeNB 100-1. The MeNB 100-1 grasps that the uplink interference is caused in the PeNB 100-2 based on the Overload Indicator from the PeNB 100-2. Then, processing to search for an MUE 200-1 being an interference source among the MUEs 200-1 is started.

At step S204, the PeNB 100-2 determines a radio resource to be used for transmission of ePSS/eSSS/eMIB and notifies it to the MeNB 100-1 on the X2 interface. Or, the MeNB 100-1 determines a radio resource to be used for transmission of ePSS/eSSS/eMIB and notifies it to the PeNB 100-2 on the X2 interface.

At step S205, the PeNB 100-2 notifies the PUE 200-2 of the radio resource to be used for transmission of ePSS/eSSS/eMIB. With this, the PUE 200-2 is enabled to receive the ePSS/eSSS/eMIB. The PeNB 100-2 may give the notification to an eNB 100 (unillustrated) neighboring the PeNB 100-2. In addition, the MeNB 100-1 may notify the eNB 100-3 of the radio resource to be used for transmission of ePSS/eSSS/eMIB (at step S206).

At step S207, the PeNB 100-2 starts transmission of the ePSS/eSSS/eMIB using the radio resource to be used for transmission of the ePSS/eSSS/eMIB determined at step S204.

At step S208, the MeNB 100-1 starts the muting/power reduction.

At step S209, the MeNB 100-1 notifies the MUE 200-1 of the radio resource to be used for transmission of ePSS/eSSS/eMIB. Here, as described in the first embodiment, the MeNB 100-1 may transmit information for instructing RSRP measurement of the PeNB 100-2 based only on CRS within a specific RB or may notify downlink bandwidth information of the PeNB 100-2. Furthermore, the MeNB 100-1 may notify the MUE 200-1 of a radio resource (subframe and RB) targeted for the muting/power reduction when the muting/power reduction is performed on the CRS.

At step S210, the MUE 200-1 performs the RSRP measurement in response to the control at step S209. Specifically, the MUE 200-1 performs the RSRP measurement on the PeNB 100-2 using the ePSS/eSSS/eMIB based on the notification of the radio resource to be used for transmission of ePSS/eSSS/eMIB.

At step S211, the MUE 200-1 reports the measurement result at step S210 to the MeNB 100-1. Here, in the case of the MUE 200-1 around the boundary of the coverage area of the PeNB 100-2, the RSRP measurement result for the PeNB 100-2 is contained in the measurement report.

Note that, the processing at steps S209 to S211 may be respectively performed on multiple MUEs 200-1, or may be performed only on a candidate MUE 200-1 located around the boundary of the coverage area of the PeNB 100-2.

When the above-described collection of the measurement report is terminated, at step S212, the MeNB 100-1 terminates the muting/power reduction.

At step S213, the MeNB 100-1 notifies the PeNB 100-2 on the X2 interface of the termination of the ePSS/eSSS/eMIB. The PeNB 100-2 notifies (at step S214) the PUE 200-2 of the termination of the ePSS/eSSS/eMIB. The MeNB 100-1 may notify (at step S215) the eNB 100-3 of the termination of the ePSS/eSSS/eMIB.

At step S216, the MeNB 100-1 checks whether the measurement report received at step S211 contains the RSRP measurement result for the PeNB 100-2 (for example, the RSRP measurement result corresponding to a cell ID of the PeNB 100-2). When the measurement report does not contain the RSRP measurement result for the PeNB 100-2 (step S216; NO), the measurement setting at step S209 is cancelled at step S218.

On the other hand, when the RSRP measurement result for the PeNB 100-2 is contained in the measurement report (step S216: YES), the MUE 200-1 is identified as an uplink interference source for the PeNB 100-2. Then, at step S217, the MeNB 100-1 causes the MUE 200-1 of the interference source to perform handover from the cell of CC1 to the cell of CC2. Or, if possible, the MUE 200-1 of the interference source may perform handover to a cell of the PeNB 100-2.

In the situation shown in FIG. 1, the PeNB 100-2 is installed within the coverage area of the MeNB 100-1 and outside the coverage area of the eNB 100-3. In the situation where the PeNB 100-2 is installed in a region where the coverage areas of the MeNB 100-1 and the eNB 100-3 overlap each other, the eNB 100-3 performs the same operation as that of the MeNB 100-1. In other words, all neighboring base stations which may interfere with the PeNB 100-2 operate in cooperation with one another so as to use a same ePSS/eSSS/eMIB.

[Other Embodiments]

It should not be understood that the description and drawings which constitute one part of this disclosure limit the present invention. Various alternative embodiments, examples, and operational techniques will be obvious for those who are in the art from this disclosure.

The above-described respective embodiments are not limited to the case where they are implemented individually but may be implemented in combination with each other. For example, the technique described in the first embodiment may be applied to the second embodiment.

In addition, the information which is transmitted and received on the X2 interface in each embodiment may be transmitted and received on an S1 interface via EPC.

Furthermore, in each embodiment, the description is given using an example of the combination of an MeNB and a PeNB, but it may be a combination of an MeNB and a femtocell (HeNB), or a combination of a PeNB and a femtocell (HeNB).

The entire content of U.S. Provisional Application No. 61/555,299 (filed Nov. 3, 2011) is incorporated by reference.

INDUSTRIAL APPLICABILITY

As described above, the present invention is applicable in the field of wireless communication, such as mobile communication.

The invention claimed is:

1. A communication control method in a mobile communication system, comprising:
    limiting, by a base station, transmission powers of a physical downlink control channel region and a common reference signal in a particular cell as well as transmission powers of a synchronization signal and a master information block,
    notifying, by the base station, a user terminal under control of the base station of a radio resource targeted for the transmission power limitation of the common reference signal, and
    after the user terminal is notified of the radio resource targeted for the transmission power limitation of the common reference signal, excluding, by the user terminal, a measurement result for the radio resource targeted for the transmission power limitation of the common reference signal from channel state information (CSI) measurement results to be reported to the base station.

2. The communication control method according to claim 1, wherein at the step of limiting, the base station limits the transmission power of the physical downlink control channel region in one part of a frequency band in some of subframes in the particular cell as well as the transmission powers of the synchronization signal and the master information block, and the some of subframes are subframes in which a neighbor low power base station transmits at least one of a synchronization symbol and a master information block.

3. The communication control method according to claim 1, wherein at the step of limiting, the base station limits the transmission power of the physical downlink control channel region in one part of a frequency band in all subframes as well as the transmission powers of the synchronization signal and the master information block.

4. The communication control method according to claim 1, further comprising:
    transmitting information on the transmission power limitation from the base station to a neighboring base station.

5. The communication control method according to claim 1, wherein the base station transmits, to the user terminal, a measurement configuration for determination of the limitation of the transmission power of the synchronization signal, the master information block, and the physical downlink control channel region.

6. A base station, comprising a controller configured to control:
    limiting transmission powers of a physical downlink control channel region and a common reference signal in a particular cell as well as transmission powers of a synchronization signal and a master information block;
    notifying a user terminal under control of the base station of a radio resource targeted for the transmission power limitation of the common reference signal; and
    receiving, from the user terminal, a measurement report not including a channel station information (CSI) measurement result for the radio resource targeted for the transmission power limitation of the common reference signal.

7. A user terminal, comprising a controller configured to control:
    receiving, from a base station, a radio resource targeted for transmission power limitation of a common reference signal, the base station configured to limit transmission powers of a physical downlink control channel region and the common reference signal in a particular cell as well as transmission powers of a synchronization signal and a master information block; and
    excluding a measurement result for the radio resource targeted for the transmission power limitation of the common reference signal from channel state information (CSI) measurement results to be reported to the base station after receiving the radio resource targeted for the transmission power limitation of the common reference signal.

8. The communication control method according to claim 1, wherein
    in the step of limiting:
    the base station limits the transmission powers of the physical downlink control channel region and the common reference signal in some subframes in the particular cell with the base station and an another base station being configured to operate in subframe synchronization, and
    the base station limits the transmission powers of the physical downlink control channel region and the common reference signal in all subframes in the particular cell with the base station and the another base station being configured to operate in out of subframe synchronization, and the some of subframes are subframes in which a neighbor low power base station transmits at least one of a synchronization symbol and a master information block.

* * * * *